(12) United States Patent
Kumar

(10) Patent No.: US 11,560,266 B1
(45) Date of Patent: Jan. 24, 2023

(54) HETEROGENEOUS INSULATED BAG FOR FOOD DELIVERY TO END CONSUMERS

(71) Applicant: Amazon Technologies, Inc., Seattle, WA (US)

(72) Inventor: Karthik Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 271 days.

(21) Appl. No.: 15/690,440

(22) Filed: Aug. 30, 2017

(51) Int. Cl.
| | | |
|---|---|---|
| B65D 81/18 | (2006.01) | |
| B65D 81/38 | (2006.01) | |
| B65B 25/00 | (2006.01) | |
| A47J 41/00 | (2006.01) | |

(52) U.S. Cl.
CPC .......... B65D 81/18 (2013.01); A47J 41/0044 (2013.01); B65B 25/001 (2013.01); B65D 81/3888 (2013.01)

(58) Field of Classification Search
None
See application file for complete search history.

(56) References Cited

U.S. PATENT DOCUMENTS

| | | | | |
|---|---|---|---|---|
| 2,112,406 A * | 3/1938 | Metro | ................... | B65D 31/12 383/38 |
| 2,730,151 A * | 1/1956 | Smith | ..................... | A45C 3/00 383/110 |
| 4,338,795 A * | 7/1982 | House, Jr. | ............. | A45C 11/20 62/372 |
| 4,691,368 A * | 9/1987 | Roessiger | ............. | B65D 31/04 206/526 |
| 4,708,248 A * | 11/1987 | Davis | .................... | A45C 11/20 206/548 |
| 4,819,793 A * | 4/1989 | Willard | ................... | A45C 3/04 206/162 |
| 6,220,051 B1 * | 4/2001 | Takasugi | .............. | B60H 1/3202 62/530 |
| 6,223,551 B1 * | 5/2001 | Mitchell | ............... | B65D 31/04 62/371 |
| 6,422,032 B1 * | 7/2002 | Greene | .................... | F25D 3/08 62/457.2 |
| 2003/0152724 A1 * | 8/2003 | Swoboda | ........... | B65D 81/3823 428/34.2 |
| 2005/0056048 A1 * | 3/2005 | Fuchs | .................... | A45C 11/20 62/457.7 |

(Continued)

FOREIGN PATENT DOCUMENTS

WO WO-2016182493 A1 * 11/2016 ......... B65D 81/3888

OTHER PUBLICATIONS

"How to Pack a Grocery Bag" Jun. 13, 2017 <web.archive.org/web/20170613130933/https://www.theorderexpert.com/organizing-tip-how-to-pack-a-grocery-bag/> (Year: 2017).*

(Continued)

Primary Examiner — Viren A Thakur
(74) Attorney, Agent, or Firm — BakerHostetler

(57) ABSTRACT

A food delivery enclosure for delivering groceries includes a low insulation zone and a high insulation zone. The low insulation zone includes energy packs, such as chill packs or hot packs and food items suitable for contact with the energy packs. The high insulation zone is above the low insulation zone and includes food items that are not suitable for contact with the energy packs.

18 Claims, 4 Drawing Sheets

(56) References Cited

U.S. PATENT DOCUMENTS

| | | | | |
|---|---|---|---|---|
| 2011/0259894 | A1* | 10/2011 | Cheung | A45C 11/20 |
| | | | | 220/592.01 |
| 2012/0243808 | A1* | 9/2012 | de Lesseux | B65D 5/60 |
| | | | | 383/110 |
| 2012/0305435 | A1* | 12/2012 | Matta | B65D 81/3862 |
| | | | | 206/521 |
| 2014/0174692 | A1* | 6/2014 | Emond | F28F 13/00 |
| | | | | 165/47 |
| 2015/0253056 | A1* | 9/2015 | Richardson | F25D 3/08 |
| | | | | 62/457.7 |
| 2018/0148246 | A1* | 5/2018 | Fu | B32B 5/26 |
| 2018/0290815 | A1* | 10/2018 | Waltermire | A47J 41/0066 |
| 2019/0031415 | A1 | 1/2019 | Kumar | |

OTHER PUBLICATIONS

Bioplastics Magazine, "BASF extends its portfolio of innovative foam solutions with ecovio EA." Jul. 4, 2016 <https://www.bioplasticsmagazine.com/en/news/meldungen/BASF-extends-its-portfolio-of-innovative-foam-solutions-with-biobasedecovio-EA-.php> (Year: 2016).*

ECOGEHR—Feb. 15, 2015 <web.archive.org/web/20150215044054/https://www.professionalplastics.com/ECOGEHR_PLA> (Year: 2015).*

\* cited by examiner

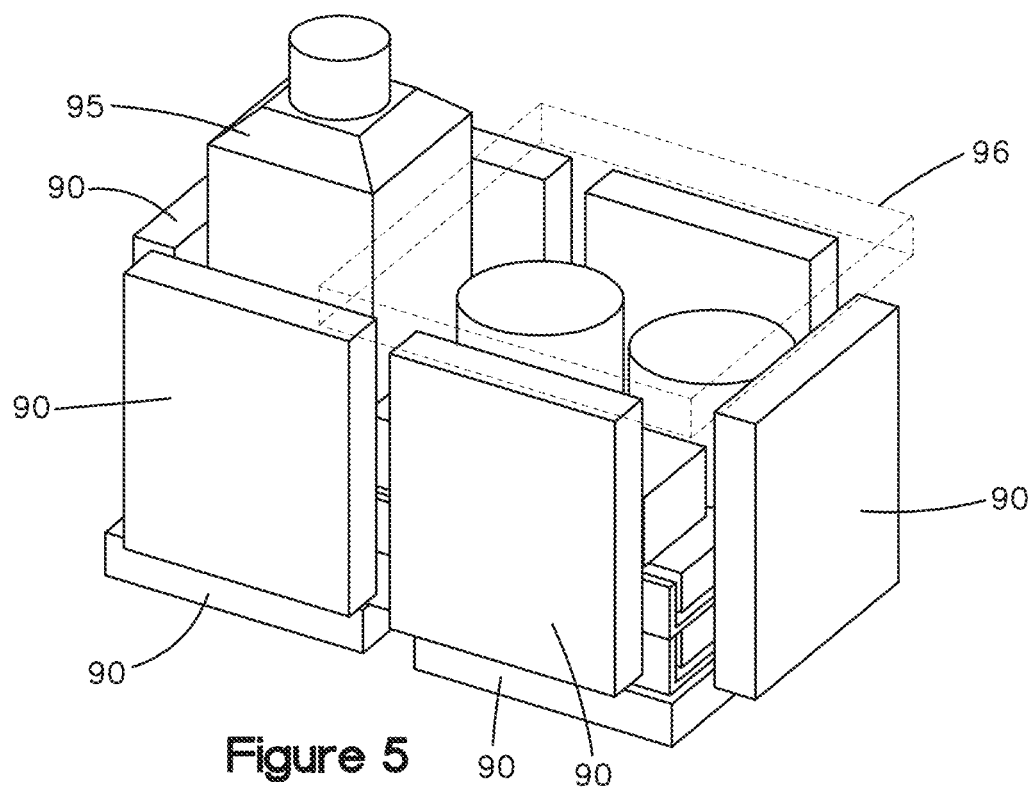
Figure 5
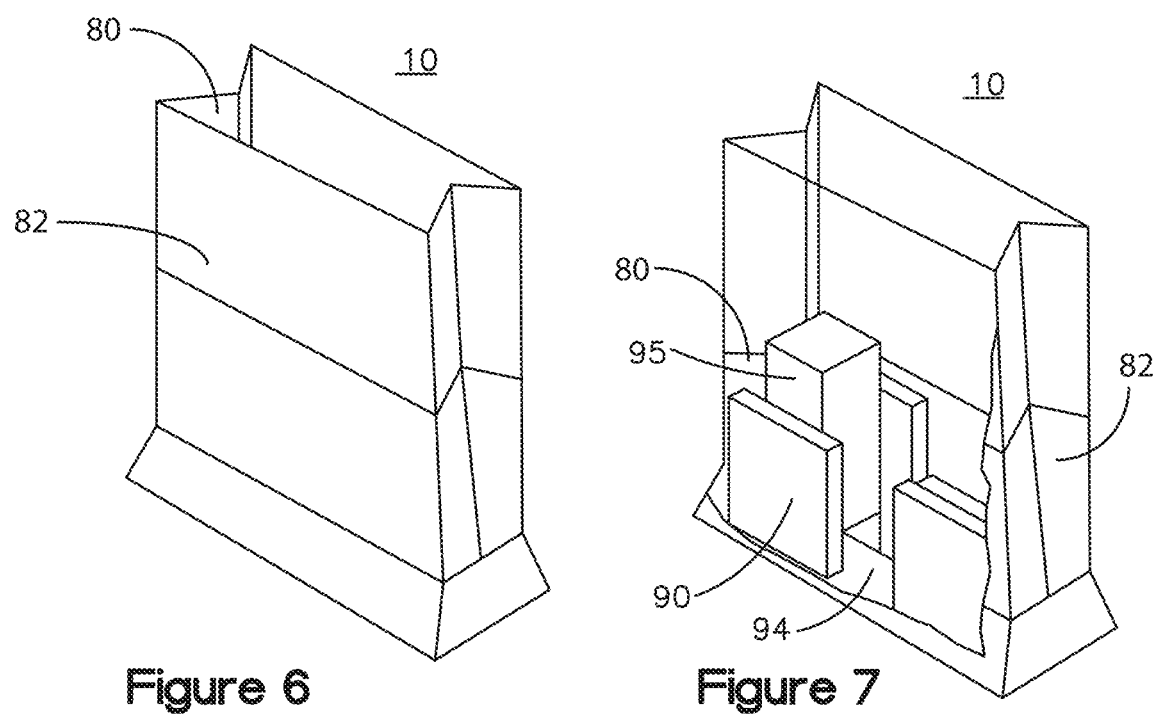
Figure 6
Figure 7

HETEROGENEOUS INSULATED BAG FOR FOOD DELIVERY TO END CONSUMERS

BACKGROUND

The present invention relates to packaging food products, and more particularly to packaging food products for hot or cold retail delivery.

Home delivery of groceries to an end customer often includes transporting the groceries in insulated bags or totes directly to a consumer's home. The bags or totes are designed to maintain temperatures of products below a critical temperature or reduce the rate of increase in temperature, or in the case of hot food to maintain temperatures of products above a critical temperature. Typically insulated bags are used in conjunction with chill packs, such as ice packs of water, or a water and alcohol mixture, or the like. In this regard, the term "chill pack" is used to refer to any type of enclosed energy sink, regardless whether latent or sensible energy is employed and regardless whether the packs are reusable or disposable, and in some circumstances refers to frozen containers of the food itself, as explained more fully below. Often, several chill packs are used in the enclosure irrespective of outside temperature, time to delivery and payload.

Alternatively, some products are delivered hot, in which case insulated bags are sometimes used with a hot pack. In this regard, the term "energy source" is used herein to encompass both a chill pack (such as an ice pack or like cold source) pack and a hot pack (such as water heated to 120 to 130 degrees or like heat source).

BRIEF DESCRIPTION OF THE FIGURES

FIG. 5 is a perspective view of packaged food items and eight energy packs arranged to be proximate the sidewalls and proximate the floor to illustrate an aspect of an embodiment of the present invention, with the enclosure removed for clarity;

FIG. 6 is a perspective view of a bag according to an aspect of the present invention, illustrating a low thermal conductance wall portion and a high thermal conductance wall portion;

FIG. 7 is a partially cut away view of the bag shown in FIG. 6;

DETAILED DESCRIPTION OF PREFERRED EMBODIMENTS

In typical delivery of groceries to an end consumer, an insulated bag or tote includes several chill packs to keep perishable food items fresh. Delivery of hot foods also often occurs in insulated bags. As explained more fully below, the term "enclosure" broadly encompasses bags, totes, and other containers that may be used to transport perishable food items. A popular chill pack is frozen to between zero and 32 degrees F., such as 10 degrees F. The temperature of conventional chill packs is not compatible with all foods, as the appearance or texture or other attributes of some foods (for example, yogurt) can degrade if the product freezes while in the enclosure and then thaws, even if arriving at the proper chill temperature upon delivery. Further, even if the food items do not freeze, chill pack temperatures (by contact or proximity to the foods, or by over-chilling) can harm the appearance or texture of some foods, including fruits such as bananas and vegetables such as salad mixes and the like, as will be understood by persons familiar with the systems of residential grocery delivery. The term "food item" encompasses groceries and hot, prepared foods unless specifically recited otherwise in the claims.

Figure 1:
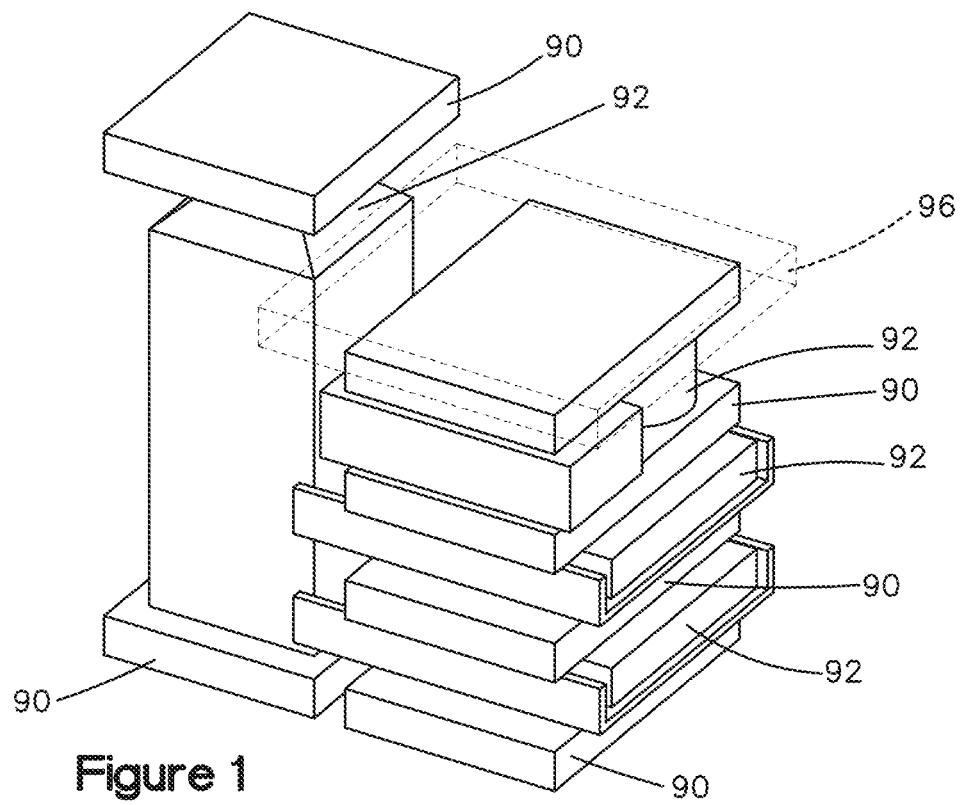
FIG. 1 (Prior Art) is a perspective view of packaged food items arranged in a layered configuration with chill packs, with the enclosure removed for clarity.

FIG. 1 illustrates one prior art style of packaging groceries in a bag or tote (not shown for clarity) in which ice packs 90 are roughly horizontally layered intermittently with food items 94 alongside a milk carton 95. A food item that is not suitable for direct contact with chill packs 90, such as a pre-packaged salad 96, is illustrated above the other food items 94 and spaced apart from the chill packs 90. Packing the products in layers is cumbersome for the person or machine packing the enclosure, as items having irregular shapes tend to make packing ad hoc.

Further, conventional grocery delivery services typically use a standard number of chill packs per tote or bag to safely accommodate the large number of possible combinations of food items. Often a greater number of chill packs are used than needed to maintain the food items above the critical temperature. But using excess chill packs can deliver a negative customer experience because chill packs need to be disposed of or returned and are also heavy and take up space inside the enclosure that could be used for food items. Customers may encounter similar problems with respect to heat packs.

Accordingly, an enclosure and method of packaging food items for home delivery are provided that, in some configurations, place chill packs along the walls of the enclosure to optimize temperature management within the enclosure and enable the chill packs to provide an insulating factor to the walls of the enclosure, thereby enabling the insulation in the enclosure wall to be eliminated or diminished in the region of the chill packs relative to the region without the chill packs. Alternatively, hot packs can be employed with a like enclosure structure for delivery of hot foods. The description focuses on chill packs 90, but it understood that the invention encompasses delivery of hot food by hot packs (also designated by reference numeral 90). In this regard, the term "energy pack" is used to encompass both a chill pack and a hot pack. The energy packs can be removable and inserted in the enclosure in the delivery process as needed, or can be permanently affixed to the sidewalls such that the enclosure is subjected to the cold or hot temperatures at a convenient time in the delivery process.

As explained more fully below and referring generally to the figures, a bag enclosure 10 defines a low insulation zone 12 and a high insulation zone 14 such that the low insulation zone 12 is defined by a floor 20 and a high thermal conductance sidewall 30. As explained more fully below, low insulation zone 12 is associated with the coldest zone of enclosure 10 and high insulation zone 14 is associated with zone of the enclosure that is higher than the cold zone of zone 12. The configuration of relatively little or no added insulation in the zone of the energy packs is somewhat paradoxical, as most conventional bags have the same magnitude of insulating capacity throughout the bag, and conventional wisdom would lead to believe that the insulating capacity in the region of the energy packs should be relatively higher, rather than relatively lower.

Preferably, floor 20 is flat and a horizontal cross section through the low insulation zone 12 is rectangular such that enclosure 10 stands up on its own without external support or stiffening.

The high insulation zone 14 is defined at least partially by a low thermal conductance sidewall 50 such that the high insulation zone 14 is located above the low insulation zone 12. Energy sources 90, such as chill packs or hot packs, are located in the low insulation zone 12 proximate the high thermal conductance sidewall 30. Perishable food 94, 95, 96 is disposed in the container 10. First food items 94 and milk 95 are food items that are amenable to contact with a low temperature chill pack and/or amenable to the temperatures in a low temperature zone of the enclosure. Food items 96 are food items that are not amenable to contact with a low temperature chill pack and/or not amenable to the temperatures in a low temperature zone of the enclosure.

The second food items 96 are inserted into the bag on top of or above the first food items 94. Preferably, the low thermal conductance sidewall 50 is continuous with the high thermal conductance sidewall 30, as the lower wall merges smoothly into the upper wall. The low thermal conductance sidewall 50 has insulating capacity greater than that of the high thermal conductance sidewall 30.

Figure 2:
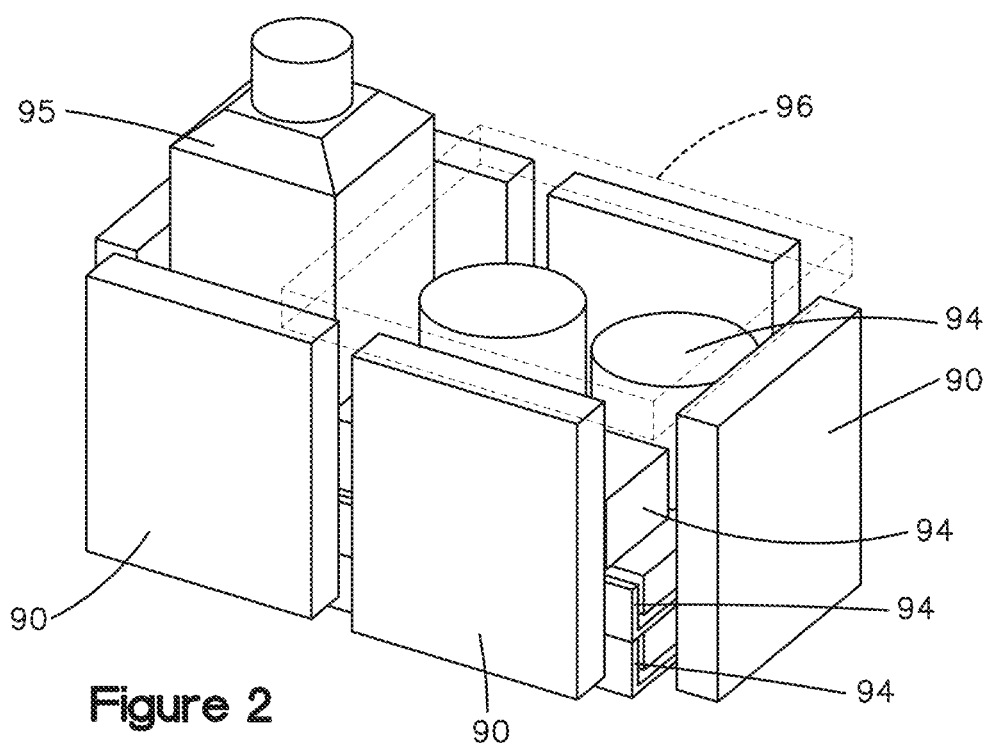
FIG. 2 is a perspective view of packaged food items and six energy packs arranged to be proximate the sidewalls to illustrate an aspect of an embodiment of the present invention, with the enclosure removed for clarity.
Figure 3:
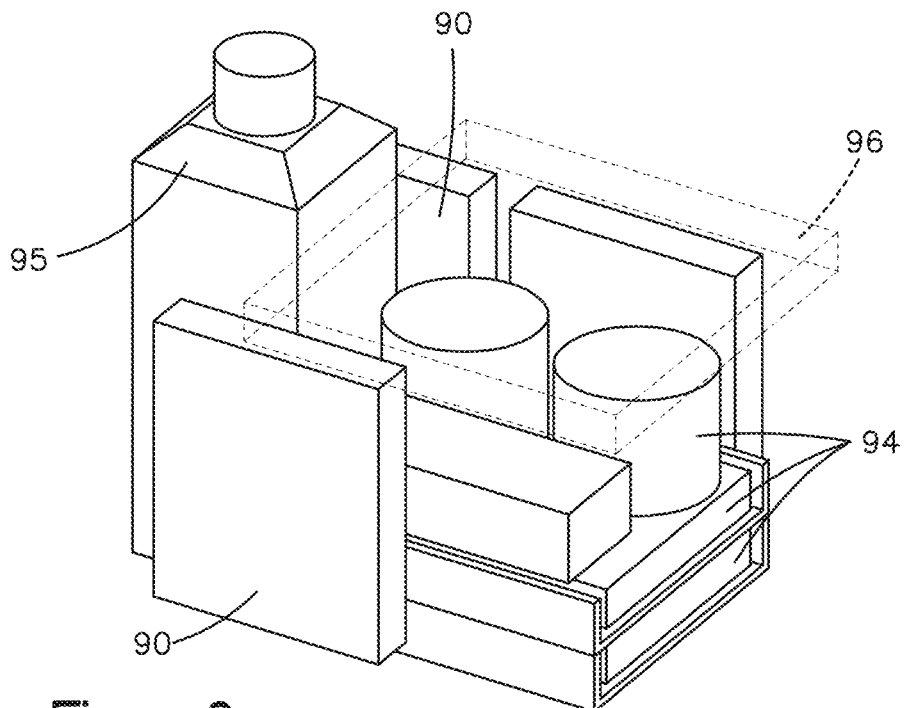
FIG. 3 is a perspective view of packaged food items and two energy packs arranged to be proximate the sidewalls to illustrate an aspect of an embodiment of the present invention, with the enclosure removed for clarity.
Figure 4:
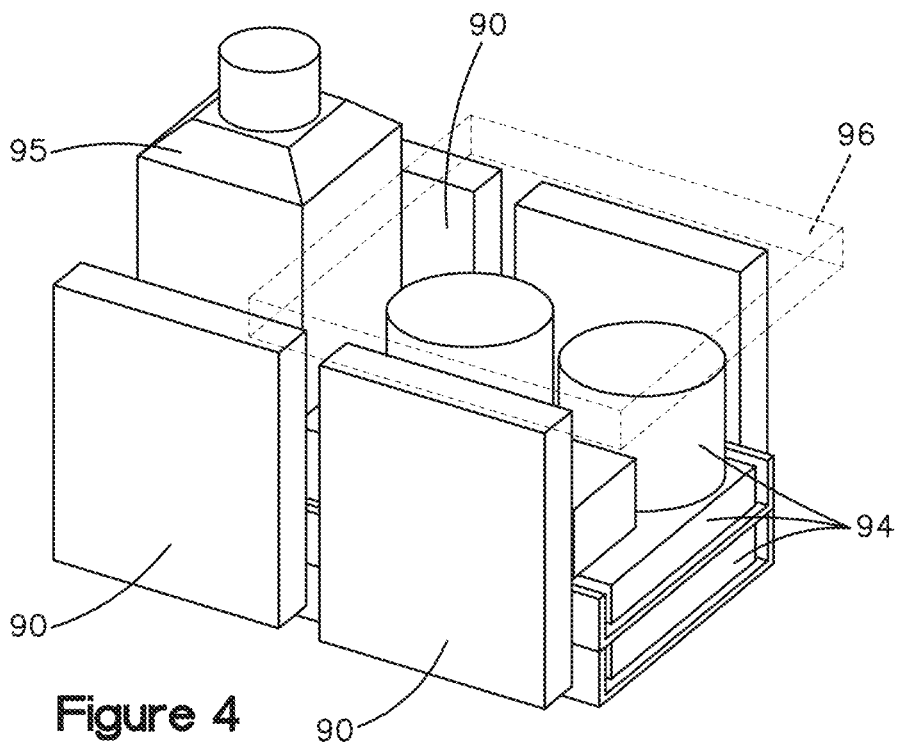
FIG. 4 is a perspective view of packaged food items and four energy packs arranged to be proximate the sidewalls to illustrate an aspect of an embodiment of the present invention, with the enclosure removed for clarity.

FIGS. 2 through 7 illustrate the configurations in which food items can be organized according to an aspect of the prevent invention. FIG. 2 illustrates the configuration of chill packs 90 relative to food items 94, 95, and 96 when employing six chill packs. FIG. 3 illustrates the configuration for two chill packs 90; FIG. 4 illustrates the configuration for four chill packs 90, and FIG. 5 illustrates the configuration for eight chill packs 90. As illustrated in FIGS. 2 through 4, chill packs 90 are located outboard of the food items 94 and are located inboard of a sidewall of an enclosure, and preferably in contact with an inner surface 80 of lower wall 30.

Referring to FIGS. 6 and 7, enclosure 10 includes a sidewall that extends upwardly from floor 20, from which high thermal conductance sidewall 30 extends. Low thermal conductance sidewall 50 extends directly upwardly from high thermal conductance sidewall 30 in the figures. Lower sidewall 30 includes a pair of opposing, upstanding main walls 32 and a pair of opposing, folding end walls 34. Upper sidewall 50 includes a pair of opposing, upstanding main walls 52 and a pair of opposing, folding end walls 54. The upstanding walls preferable are vertical or nearly vertical when the enclosure 10 is resting on a datum.

Figure 8:
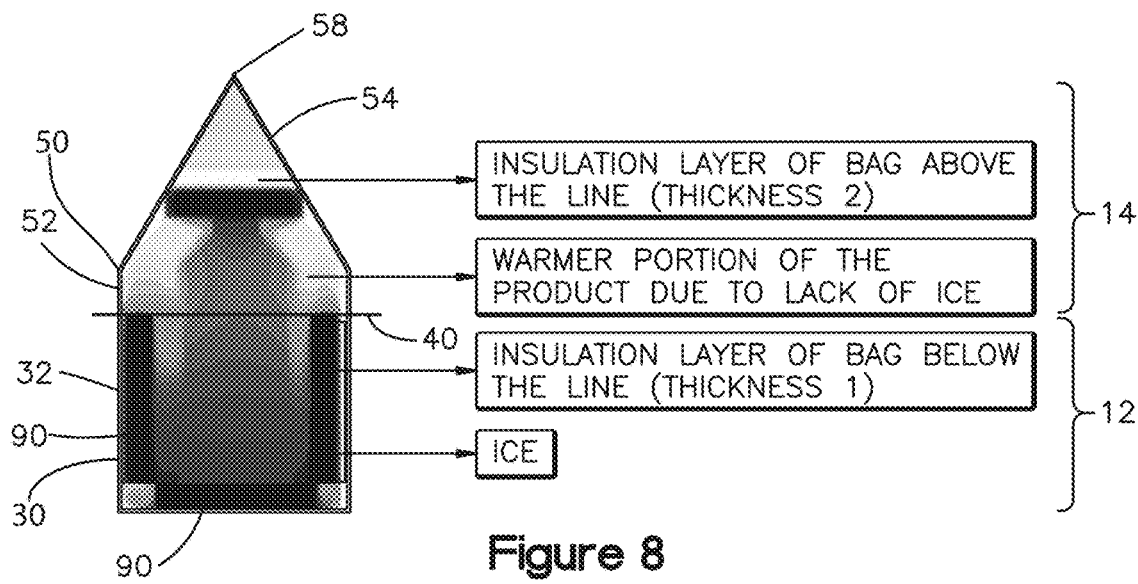
FIG. 8 is the result of a computational fluid dynamics analysis illustrating aspects of the present invention.

An upper portion of upper wall 50 bends inwardly to form sloped walls 56 that are joined together at a longitudinal centerline to form a seam 58, as illustrated schematically in FIG. 8. Seam 58 may be a rolled together portion of sloped walls 56, a heat sealed portion, or any other mechanical or chemical bond, as will be understood by persons familiar with bag technology. When sloped walls 56 are joined together at seam 58, the space within enclosure 10 is fully enclosed.

Enclosure 10 as illustrated as a paper bag having an insulation material between an inner paper layer 80 and an outer paper layer 82. Preferably, layers 80 and 82 are treated for resistance to liquids by any conventional means. The present invention is not limited to the particular materials of layers 80 or 82, or even the existence of two layers. Rather, the present invention broadly uses the term "enclosure" to encompass any paper, paperboard, plastic, or other material, regardless whether flexible or rigid and regardless whether shaped as shown in the figures, or cuboid or cylindrical with a removable or tearable lid, or any other shape unless expressly set out in the claims.

Figure 9:
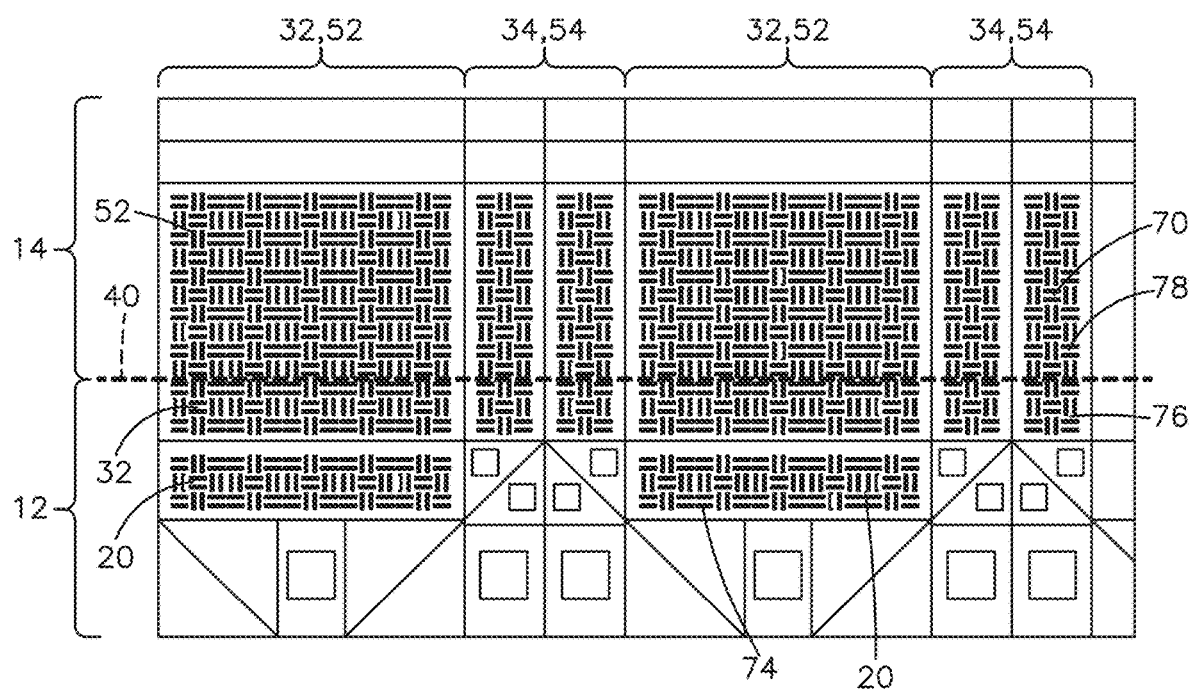
FIG. 9 is a layout view of a bag before entering a bag forming machine, illustrating aspects of the present invention.

Referring to FIG. 9 to illustrate the insulation layer 70 on a substrate 80, the bag 10 is shown in its laid open configuration before the flat panels are joined together in a bagging machine to form a conventional bag configuration. Insulation 70 comprises an insulation material having a plurality of expandable microspheres, which is indicated by reference numeral 74 for floor 20, 76 for high conductance sidewall 32, and 78 for low conductance sidewall 52.

The microspheres may be those manufactured and sold by Akzo Nobel under the name Expancel or the like, or by another manufacturer. The microspheres preferably are dispersed in a binder material, such as a water-soluble and/or water-based adhesive so as to form a microsphere adhesive that is configured to adhere the microspheres to layer 80 and/or 82 as a substrate. As used herein, the term "microsphere adhesive" refers to a material that includes microspheres that are expandable or have expanded in response to exposure to an energy source, such as the application of heat by convection, microwave, ultrasound or RF heating, contact pressure, or other means know to persons familiar with microsphere insulation. Examples of microsphere adhesives include AQUENCE ENV 4200X from Henkel AG & Company, KGaA, such as AQUENCE ENV 42000 and AQUENCE ENV 42001 MFA, which expand upon exposure to convection and microwave heating, respectively.

When expanded, the insulation 70 defines a plurality of gas pockets generated by the expanded microspheres. The gas pockets can be defined in the voids of the microspheres after the hydrocarbon burns off or passes through the shell. The expanded insulation thus has an insulating value, in some circumstances having an R value (unit of thermal resistance) similar to Styrofoam, normalized by thickness. The insulating R value of the sidewall is the inverse of thermal conductance.

Additionally, when expanded, the insulation 70 can have an elastic property that can provide impact resistance. In fact, the insulation 70 can have a soft, puffy like structure after expansion. Insulation 70 formed as described herein can have approximately 45%, or up to as much as approximately 75%, greater impact resistance than a bubble wrap of equivalent thickness. Accordingly, insulation 74 on floor 20 may have a different thickness or density than in insulation 76 on high thermal conductance wall 32.

Using a water-based and/or water-soluble adhesive enables the microspheres to be easily removed from the substrate to during the recycling process. Repulpability and recycling studies confirm that bags made from microsphere adhesives can have a 91.2% fiber recovery rate, compared to a recovery rate of 92.9% for corrugate, and well exceeding the 80% yield rate criteria provided by the Fibre Box Association (FBA). Depending on the amount of microsphere adhesive, the recovery rate can be greater than or less than 91.2%. In this regard, enclosure 10 is considered to be curbside recyclable. Additionally, microsphere adhesives described herein are certified as Direct Food Contact Safe per the Federal Drug Administration (FDA) regulations, and therefore can be used in food packaging applications.

U.S. patent application Ser. No. 15/661,779 (the "779 application"), entitled "Packaging Material Having Microsphere Insulation Members That Expand Towards One Another", filed Jul. 27, 2017) is incorporated herein by reference in its entirety. The 779 application includes information about preferred insulation materials and structure. The present invention is not limited to the structure, materials, and function explained in the 779 application, but rather the present invention encompasses any structure and materials that provide the insulation structure and function, including only corrugate itself, consistent with that set out in the claims, as will be understood by persons familiar with enclosure and packaging technology.

As illustrated in FIG. 9, insulation 70 is laid out in a basket weave pattern of the substrates. The dashed line through FIG. 9 indicates the boundary 40 between the high thermal conductance wall 32 and the low thermal conductance sidewall 52. In this regard, the high thermal conductance sidewall 32 and the floor 20 have a microsphere insulation 76, 74 thickness of approximately 0.1 inches to 0.2 inches. Thus, the total thickness of the floor and wall 32 is 0.1 to 0.2 inches plus the thickness of the paper layers 80 and 82. Conventional grocery delivery bag thickness for insulation of the same general type has been 0.3 inches or greater.

The low thermal conductance sidewall 52 has a microsphere insulation 78 thickness of approximately 0.5 inches, a preferably between 0.35 and 0.65 inches throughout the upper wall 52 from the dashed line through the sloped portion 54 to seam 58. In a preferred embodiment, chill packs 90 are 6 to 7 inches high, and thus the dividing line between the thick and thin insulation 78 and 76, as well as the boundary between the low insulation zone 12 and the high insulation zone 14, is 6 to 7 inches from the inside surface of the floor 20. The enclosure dimensions and energy pack dimensions can be chosen such that the energy packs line approximately the entirety of the low thermal conductance sidewall, given that some gaps between packs 90 are required to promote ease of insertion of the packs and, in the case in which the energy packs are removable, removal of the energy packs. A preferred size of enclosure 10 is 12.5 inches long, 8.5 inches wide, and 19 inches high in some circumstances. The particular dimensions and thermal properties of the enclosure and energy packs can be determined according to the desired time and temperature parameters of the food and the delivery system.

FIG. 8 is thermal color graph calculated using computational fluid dynamics (STAR-CCM+) with color indicated red (relatively high temperature) to blue (relatively low temperature). As is clear from the image, chill packs 90 provide both an energy source (in this regard, a heat sink as the ice warms and melts, and then the water warms) and act to insulate sidewall 32. The insulation of enclosure 70 has been described with respect to a particular embodiment. The present invention is not limited to the specific structure or materials of the insulation or sidewalls, but rather encompasses any insulating and substrate material. Preferably the insulating material is the same in sidewalls 32 and 52, and the difference in insulating or heat conductance values is due entirely to differences in thickness. The present invention encompasses low thermal conductance wall 52 having a different insulation material from that of high thermal conductance sidewall 32, and even sidewall 32 having no insulation material at all.

In operation, a person or an automated system can determine the number of chill packs (or hot packs) required by the particular list of food items to be packaged. Energy packs 90 can be inserted into enclosure 10 along the walls and preferably in contact with the inner surface 80 of high thermal conductance wall portion 32. In some embodiments, chill packs 90 are laid horizontally on the inboard surface of floor 20. In some circumstances, a frozen food item (such as boxed or bagged frozen vegetables) may be the chill pack 90 that is positioned in contact with or near the high thermal conductance sidewall. In this regard, the frozen food item can replace the ice-based chill pack 90, or multiple frozen food items can replace multiple ice-based chill packs, in enclosure 10. The term "ice-based chill pack" refers to conventional chill packs, and excludes a pack that houses edible food intended for delivery to the end consumer.

First food items 94, such as packaged meats, cheese, and like materials that are suitable for contact with the temperature of chill pack 90 (or alternatively with hot pack 90) are loaded into the plenum created between chill packs 90. Upon filling the plenum, second food items 96, such as some fruits and vegetables, that are generally not suitable for direct contact with chill packs 90 (or hot packs 90) and that in some circumstances do not require the cold temperatures associated with low temperature zone 12, may be loaded on top of first food items 94. Where needed, a barrier such as a sheet of corrugate may separate low insulation zone 12 from high insulation zone 14, and thus separate and protect second food items 96 from energy packs 90.

In an embodiment in which hot food, such as a prepared meal from a restaurant or hot meal preparation and/or delivery company, is employed, enclosure 10 having hot packs 90 may be configured to be formed of only microwave safe materials such that enclosure 10 may be inserted into a microwave for heating to the desired temperature. The microwave heating process may be used to prepare enclosure 10 for food, or may be used to simultaneously heat hot packs 10 and the food items in enclosure 10 while the food items are in enclosure 10.

The present invention has been described with respect to particular embodiments, and the specification includes statements that the invention is not limited to the particular aspects of the embodiment described. More generally, the present invention is not intended to be limited to the particular aspects of the specification or drawings, but rather is intended to be limited only by the words of the claims.

I claim:

1. A food delivery package comprising:
   a seamed bag enclosure defining an internal space having a low insulation zone and a high insulation zone, the low insulation zone being defined by a floor and a high thermal conductance sidewall, the high insulation zone being defined at least partially by a low thermal conductance sidewall and a low thermal conductance end wall such that the high insulation zone is located above and contiguous with the low insulation zone, wherein the high thermal conductance sidewall has a higher thermal conductance relative to the low thermal conductance sidewall and the low thermal conductance end wall;
   one of removable chill packs and removable hot packs located in the low insulation zone and lining the high thermal conductance sidewall; and perishable food disposed in the bag enclosure, including first food items proximal to the one of removable chill packs and removable hot packs and second food items that do not require proximity to the one of removable chill packs and removable hot packs wherein the low insulation zone is continuous with the high insulation zone such that, the second food items are located in the bag on top of the first food items, without a barrier between the first food items and the second food items; and wherein the low thermal conductance sidewall, the low thermal conductance end wall and the high thermal conductance sidewall include insulation material, the low thermal conductance sidewall and the low thermal conductance end wall both comprise the same insulation material as the high thermal conductance sidewall, the low thermal conductance of the low thermal conductance sidewall and the low thermal conductance end wall is achieved relative to the high thermal conductance of the high thermal conductance sidewall portion by a greater thickness of the insulation material in the low thermal conductance sidewall and the low thermal conductance end wall compared with a thickness of the insulation material in the high thermal conductance sidewall and wherein the insulation material in the low thermal conductance sidewall comprises expanded microspheres defining a plurality of gas pockets.

2. The food delivery package of claim 1 wherein the floor is a high thermal conductance wall that has a higher thermal conductance than the low thermal conductance sidewall, and includes one of removable chill packs or removable hot packs.

3. A food delivery package comprising:
a seamed enclosure including a floor, a sidewall extending upwardly from the floor and an end wall;
the sidewall includes a high thermal conductance sidewall portion and a low thermal conductance sidewall portion located above the high thermal conductance sidewall portion; the end wall includes a low thermal conductance end wall portion, wherein the low thermal conductance sidewall portion and the low thermal conductance end wall portion have an insulating capacity greater than the high thermal conductance sidewall portion and a thermal conductance lower than the high thermal conductance sidewall portion;
the enclosure defining an internal space that includes (i) a low insulation zone defined by the floor and the high thermal conductance sidewall portion and (ii) a high insulation zone defined at least partially by the low thermal conductance sidewall portion and the low thermal conductance end wall portion, and located above the low insulation zone;
one of removable chill packs or removable hot packs located in the low insulation zone proximate the high thermal conductance sidewall; and
perishable food disposed in the enclosure, including first food items proximal to the one of removable chill packs and removable hot packs and second food items that do not require proximity to the one of removable chill packs and removable hot packs, the second food items being inserted into the bag on top of the first food items;
whereby the low insulation zone of the internal space is continuous with the high insulation zone of the internal space such that, when the second food items are located in the bag on top of the first food items, and without a barrier between the first food items and the second food items; and wherein the low thermal conductance sidewall portion, the low thermal conductance end wall portion and the high thermal conductance sidewall portion include insulation material, the low thermal conductance sidewall portion and the low thermal conductance end wall portion both comprise the same insulation material as the high thermal conductance sidewall portion, the low thermal conductance of the low thermal conductance sidewall portion and the low thermal conductance of the end wall portion is achieved relative to the high thermal conductance of the high thermal conductance sidewall portion by a greater thickness of the insulation material in the low thermal conductance sidewall portion and the low thermal conductance end wall portion compared with a thickness of the insulation material in the high thermal conductance sidewall portion and wherein the insulation material in the low thermal conductance sidewall portion comprises expanded microspheres defining a plurality of gas pockets.

4. The food delivery package of claim 3 wherein the one of removable chill packs and removable hot packs line an interior surface of the sidewall of the low insulation zone outboard of the first food items.

5. The food delivery package of claim 4 wherein additional ones of removable chill packs and removable hot packs are disposed on an interior surface of the floor and below the first food items.

6. The food delivery package of claim 5 wherein the one of the removable chill packs and the removable hot packs are chill packs such that the first food items are food items that require cold temperature contact of the chill packs and the second food items are food items that do not require cold temperature contact of the chill packs.

7. The food delivery package of claim 6 wherein the chill packs are ice-based chill packs.

8. The food delivery package of claim 5 wherein the one of removeable chill packs and removeable hot packs are hot packs such that the first food items are food items that require hot temperature contact and the second food items are food items that do not require hot temperature contact.

9. The food delivery package of claim 3 wherein the sidewall includes a pair of opposing main walls, each of the main walls including an upstanding main sidewall and a sloped main sidewall, each sloped main sidewall extends inwardly.

10. The food delivery package of claim 9 wherein each of the sloped main sidewalls meet at a longitudinal centerline and form a seam to enclose the internal space of the food delivery package.

11. The food delivery package of claim 9, wherein the food delivery package further includes another end wall opposing the end wall.

12. The food delivery package of claim 3 wherein the low thermal conductance sidewall is formed of an outer layer, an internal layer, and the insulation material is located between the outer layer and the internal layer.

13. A method of packaging food for retail delivery using the food delivery package of claim 1, the method comprising the steps of:
(a) inserting one of removeable chill packs and removeable hot packs sources proximate the high thermal conductance sidewall of the seamed bag enclosure,
(b) inserting perishable first food items into the enclosure proximate the one of removeable chill packs and removeable hot packs;
(c) inserting second food items into the enclosure after the inducting step (b) such that the second food items are spaced apart from the one of removeable chill packs and removeable hot packs and proximate the low thermal conductance sidewall of the seamed bag enclosure that is located above the high thermal conductance sidewall;

whereby the second food items do not require contact with the one of removeable chill packs and removeable hot packs.

14. The method of claim 13 wherein the one of removeable chill packs and removeable hot packs are chill packs such that the first food items are food items that require cold temperature contact and the second items are food items that do not require cold temperature contact.

15. The method of claim 14 wherein the chill packs are ice-based chill packs.

16. The method of claim 13 wherein the one of removeable chill packs and removeable hot packs are hot packs such that the first food items are food items that require hot temperature contact and the second items are food items that do not require hot temperature contact.

17. The method of claim 13 wherein the low thermal conductance sidewall is formed of an outer layer, and internal layer, and the insulation material is located between the outer layer and the inner layer.

18. The method of claim 13 wherein the sidewall includes a pair of opposing main walls, each main wall including an upstanding main sidewall and a sloped main sidewall, each of the sloped main sidewalls extend inwardly, and meet at a longitudinal centerline and form a seam to enclose the seamed bag enclosure.

* * * * *